June 9, 1936. H. O. FLETCHER Re. 19,998

MILLING MACHINE

Original Filed Jan. 11, 1935 12 Sheets-Sheet 1

June 9, 1936. H. O. FLETCHER Re. 19,998

MILLING MACHINE

Original Filed Jan. 11, 1935 12 Sheets-Sheet 2

INVENTOR:
Henry O. Fletcher

June 9, 1936

H. O. FLETCHER

Re 19,998

MILLING MACHINE

Filed Jan. 11, 1935

12 Sheets-Sheet 3

INVENTOR:
Henry O. Fletcher

June 9, 1936. H. O. FLETCHER Re. 19,998
MILLING MACHINE
Original Filed Jan. 11, 1935 12 Sheets-Sheet 4
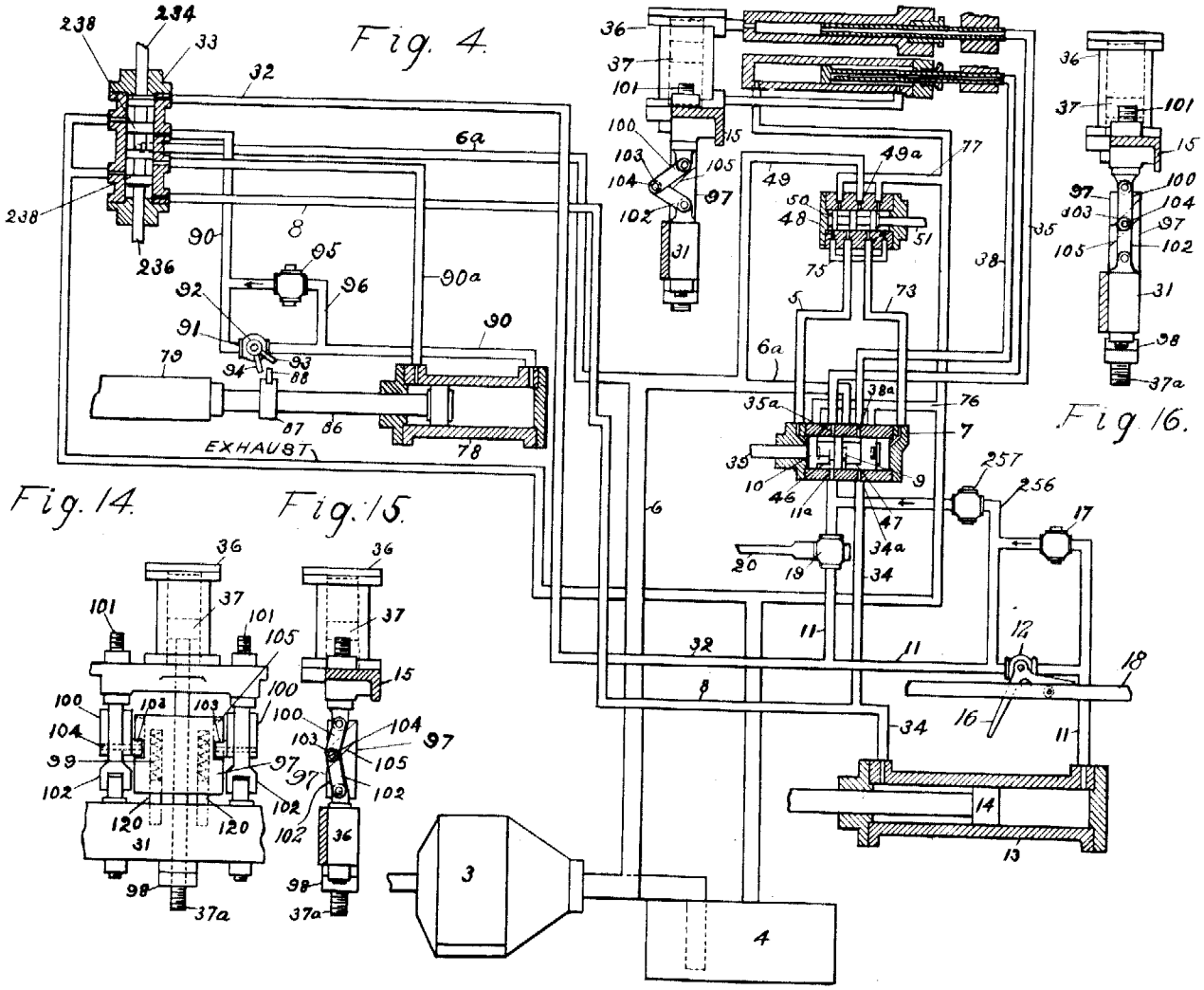
INVENTOR:
Henry O. Fletcher June 9, 1936. H. O. FLETCHER Re. 19,998

MILLING MACHINE

Original Filed Jan. 11, 1935 12 Sheets-Sheet 5

INVENTOR:
Henry O. Fletcher

June 9, 1936. H. O. FLETCHER Re. 19,998

MILLING MACHINE

Original Filed Jan. 11, 1935 12 Sheets-Sheet 6

INVENTOR:
Henry O. Fletcher

June 9, 1936. H. O. FLETCHER Re. 19,998
MILLING MACHINE
Original Filed Jan. 11, 1935 12 Sheets-Sheet 7
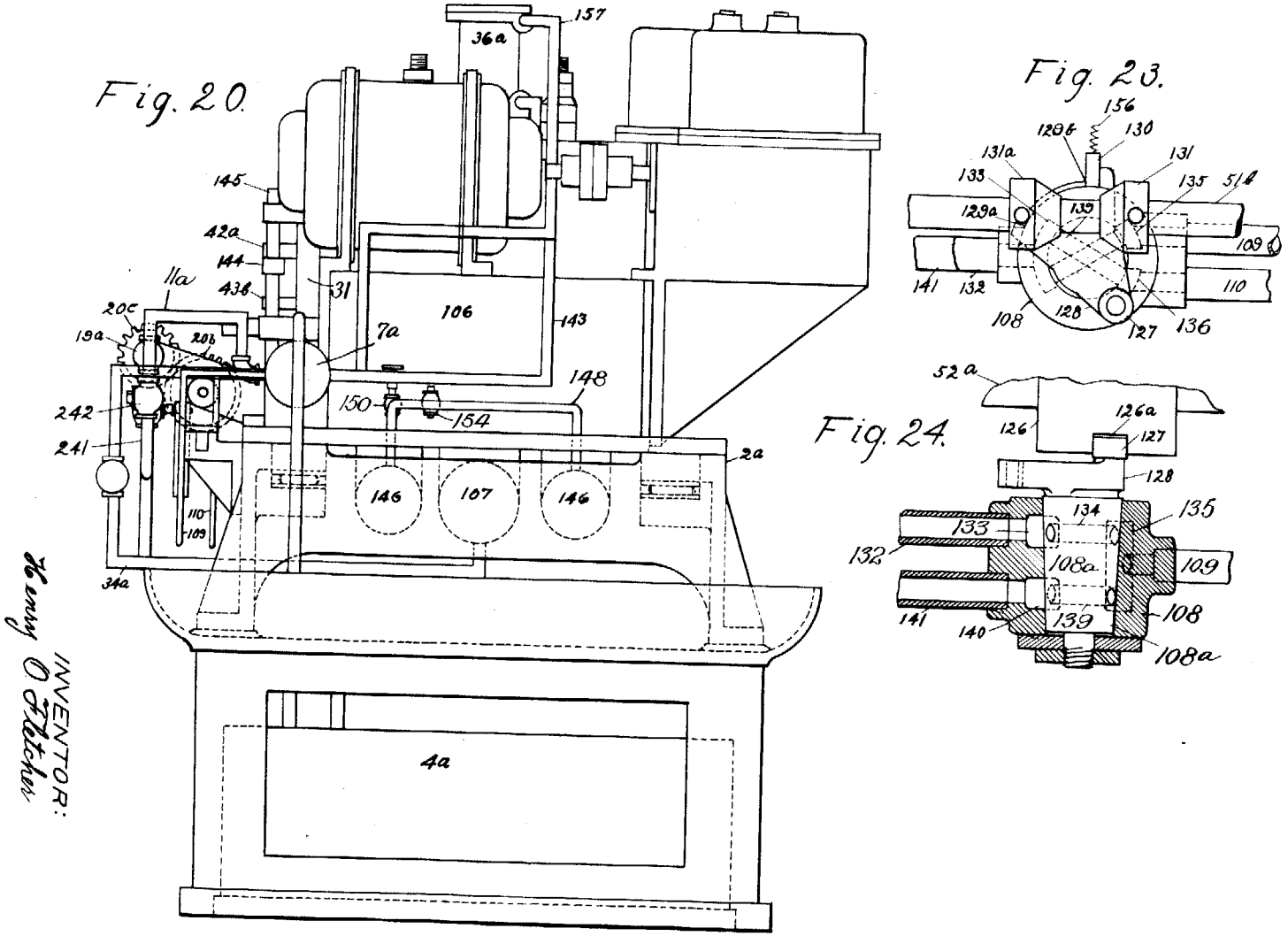

June 9, 1936. H. O. FLETCHER Re. 19,998

MILLING MACHINE

Original Filed Jan. 11, 1935 12 Sheets-Sheet 8

INVENTOR:
By Henry O. Fletcher
Atty.

June 9, 1936. H. O. FLETCHER Re. 19,998
MILLING MACHINE
Original Filed Jan. 11, 1935 12 Sheets-Sheet 9
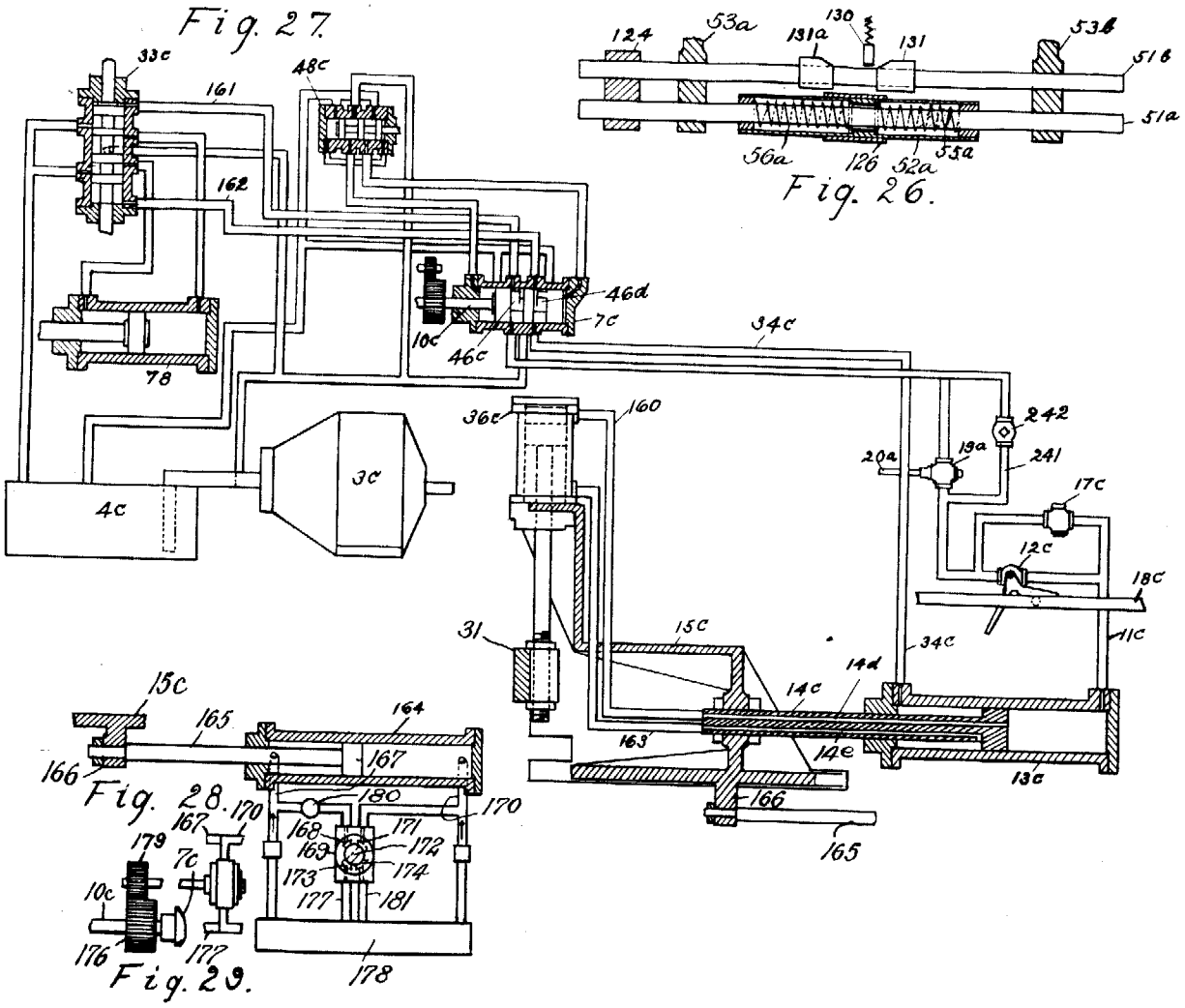
INVENTOR:
Henry O. Fletcher June 9, 1936. H. O. FLETCHER Re. 19,998

MILLING MACHINE

Original Filed Jan. 11, 1935 12 Sheets-Sheet 10

INVENTOR:
Henry O. Fletcher

June 9, 1936. H. O. FLETCHER Re. 19,998

MILLING MACHINE

Original Filed Jan. 11, 1935 12 Sheets-Sheet 11

INVENTOR:
Henry O. Fletcher

MILLING MACHINE

Original Filed Jan. 11, 1935 12 Sheets-Sheet 12

INVENTOR:
Henry O. Fletcher

Reissued June 9, 1936

Re. 19,998

UNITED STATES PATENT OFFICE 19,998

MILLING MACHINE

Henry O. Fletcher, Manchester, N. H.

Original No. 2,027,726, dated January 14, 1936, Serial No. 1,378, January 11, 1935. Application for reissue February 13, 1936, Serial No. 63,816

20 Claims. (Cl. 90—15.1)

My invention relates to milling machines, and especially to the automatic type, for performing operations on machine parts where a great number of similar parts are required, many of the important movements being accomplished by hydraulic means.

Some of the objects of my invention are to simplify the construction and provide positive movements.

In all milling machines there is a great tendency to force the cutter from its intended path of operation by the resistance of the work causing chatter and imperfect work, and excessive hydraulic pressure, when employed for the purpose of overcoming the difficulty is necessary. In the present invention I employ positive means for holding the cutter to its true path of operation thus overcoming this tendency.

Means is also provided in the present invention for preventing the advance of the cutter previous to the completion of the rotary movement of the work holder. This is accomplished by closing and opening a valve in the pipe for supplying fluid to the cutter advancing motor by means of cams carried by the work holder.

Provision is also made for conducting fluid from a stationary source to a hydraulic motor carried by a reciprocating part without the use of telescoping, or slip joints in the conductors. This is accomplished by passing the fluid through passages formed in the piston, and piston rod, of the stationary motor which operates the reciprocating part.

Another improvement consists of assisting to bring the work holder to a gradual stop during the latter part of its rotation by closing a valve in the supply line leading to the indexing motor.

Still another improvement is the introduction of a novel roller bearing on which the heavy reciprocating parts are carried thus greatly reducing friction and the power necessary to move the parts.

Other objects will be made evident by the description and claims.

As the herein described improvements are so distributed and related to the entire working of a milling machine it has been deemed necessary to represent a complete milling machine in the drawings.

Fig. 4 is a diagram of the hydraulic connections.

Fig. 5 is a sectional view of the main valve.

Figs. 6 and 7 are sectional views of the same taken on lines 6 and 7 of Fig. 5, parts being broken away to more fully reveal the operations.

Figures 3, 8, 9, 10, 11, 12, 13:
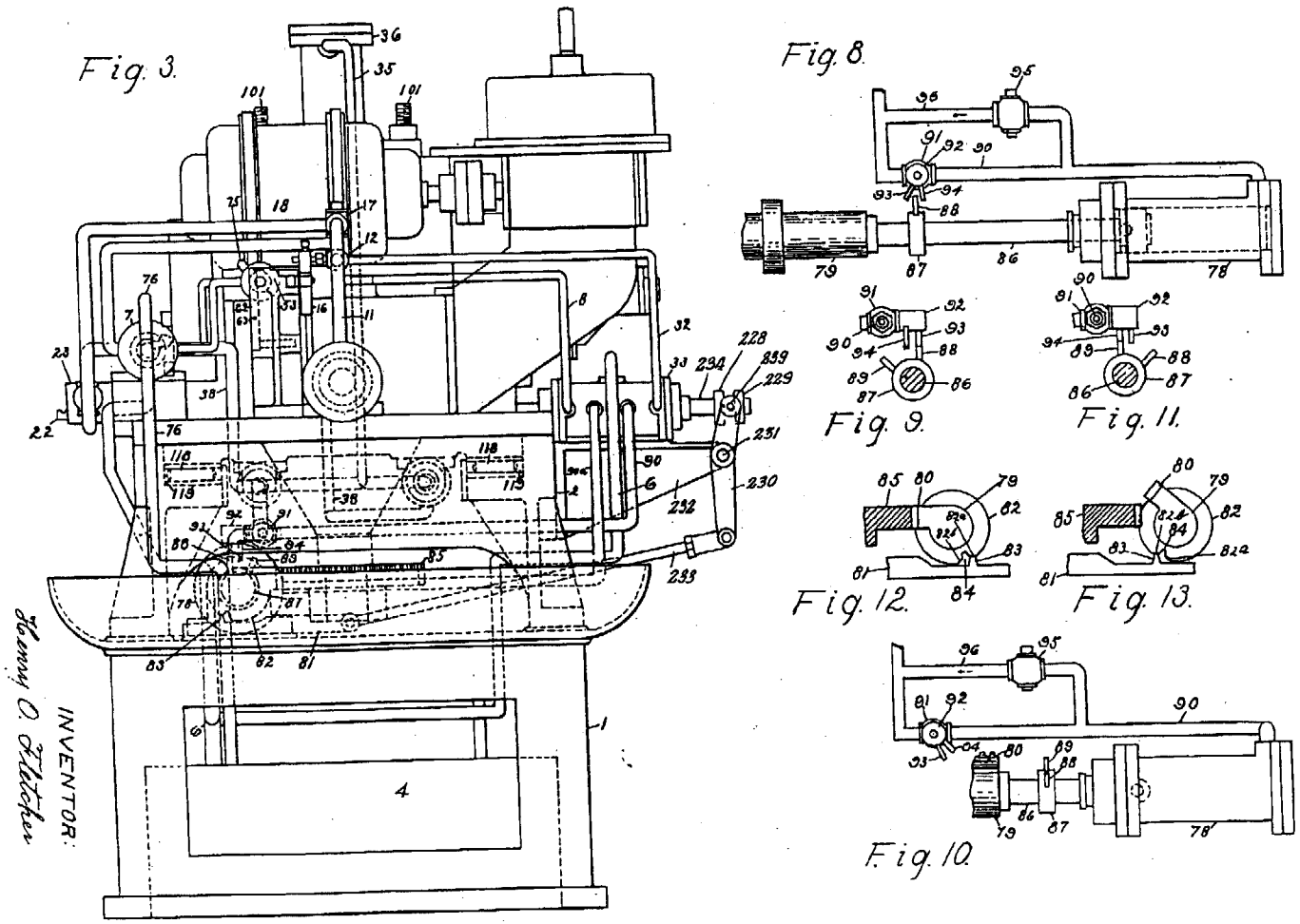
Fig. 3 is an end view looking from the right of Fig. 1.

Fig. 8 is a side view of the device for automatically opening and closing the valve supplying fluid to the turret indexing motor, showing the valve partially closed.

Fig. 9 is an end view of the same.

Figs. 10 and 11 are views respectively similar to Figs. 8 and 9 showing the valve open.

Figs. 12 and 13 are side elevations of the device for engaging and disengaging the indexing rack, and locking it in engaged and disengaged positions.

Fig. 14 is a front view.

Figs. 15 and 16 are side views of the toggle movement to prevent chattering.

Figures 2, 17:
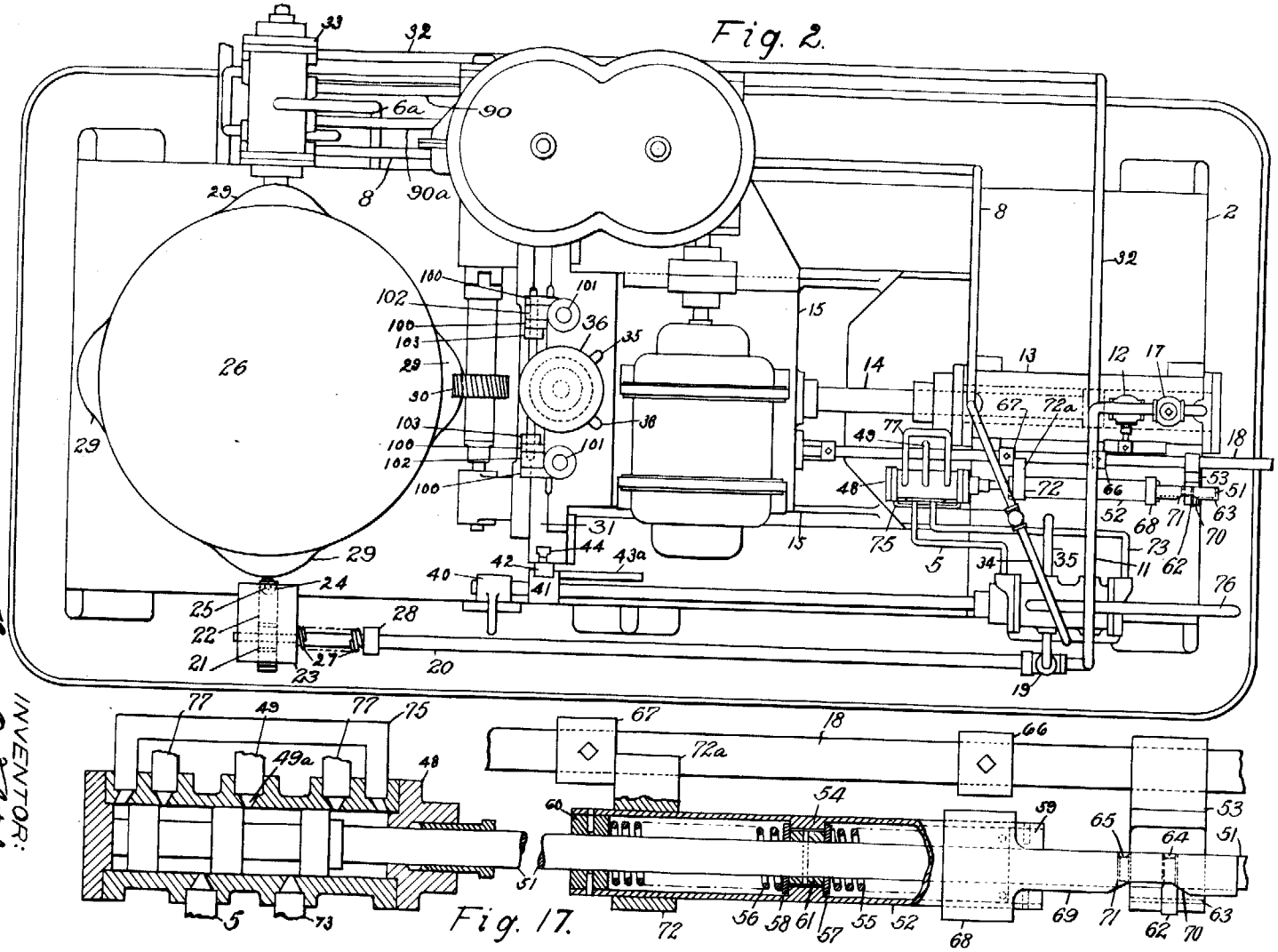
Fig. 2 is a plan view.

Fig. 17 is a plan view of a load and fire mechanism used for operating the auxiliary valve.

Figure 18:
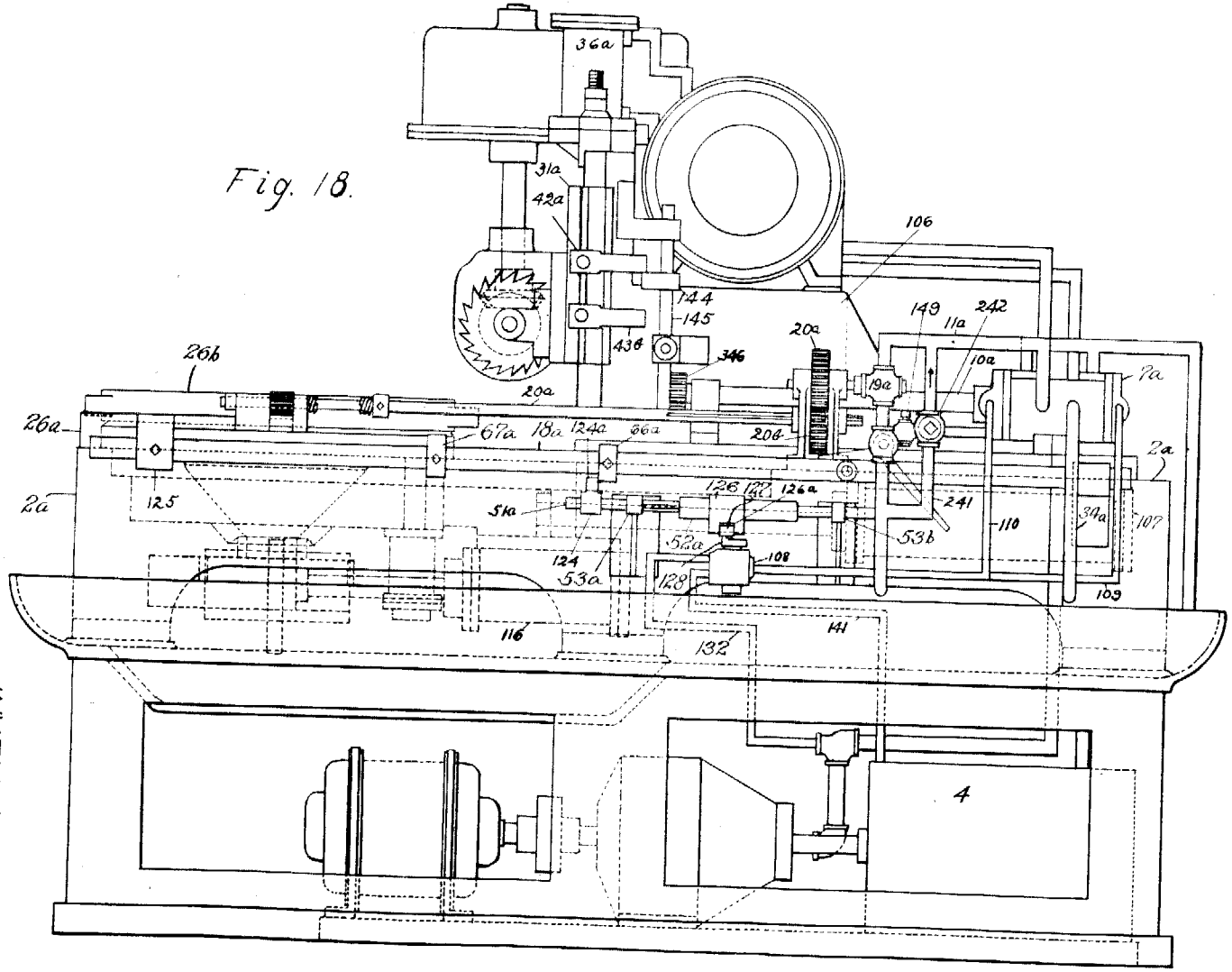

Fig. 18 is a side elevation of an embodiment employing a reciprocating work holder.

Figure 19:
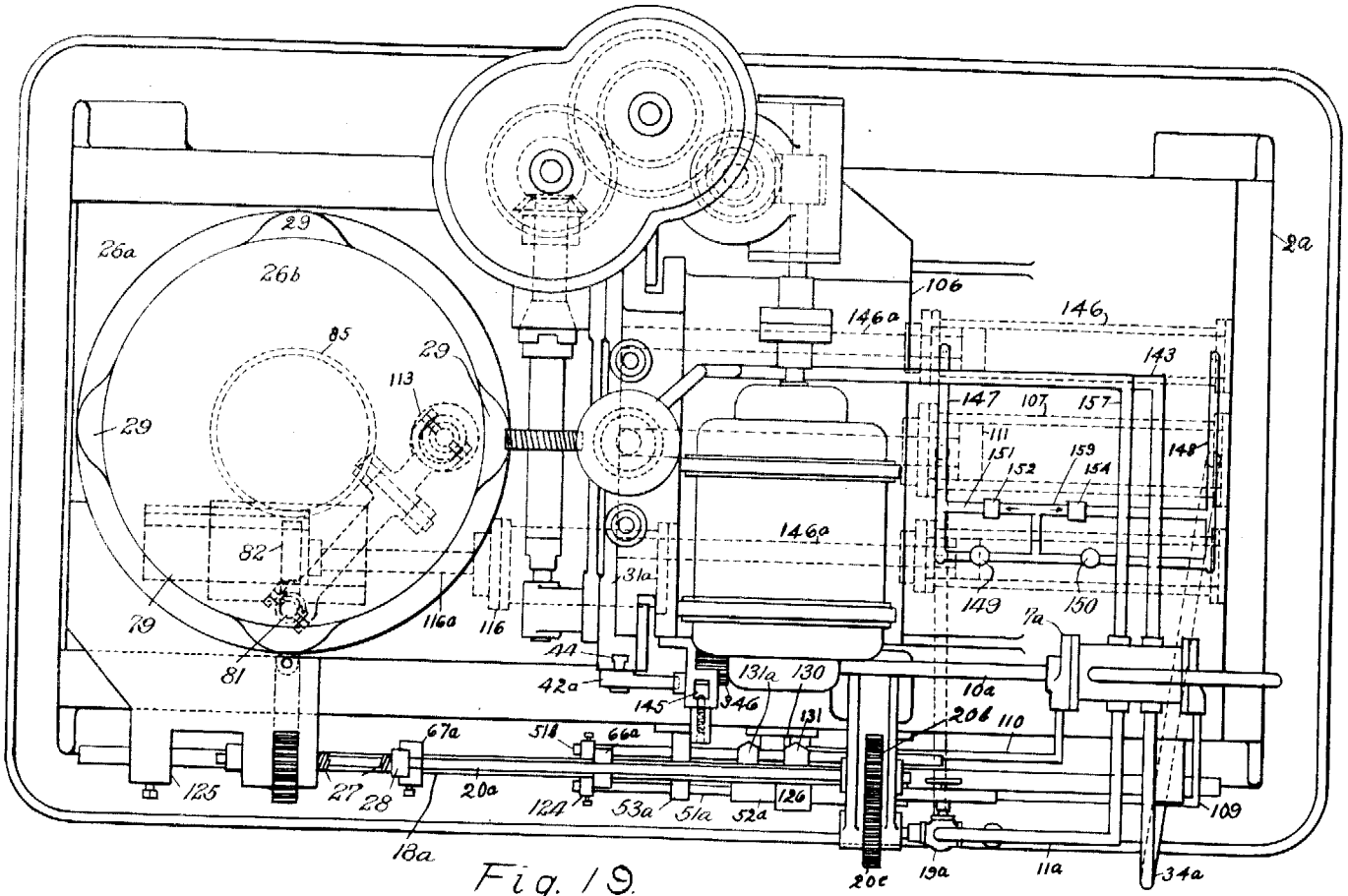

Fig. 19 is a plan view.

Fig. 20 is an end elevation of the same looking from the right of Fig. 18.

Figure 21:
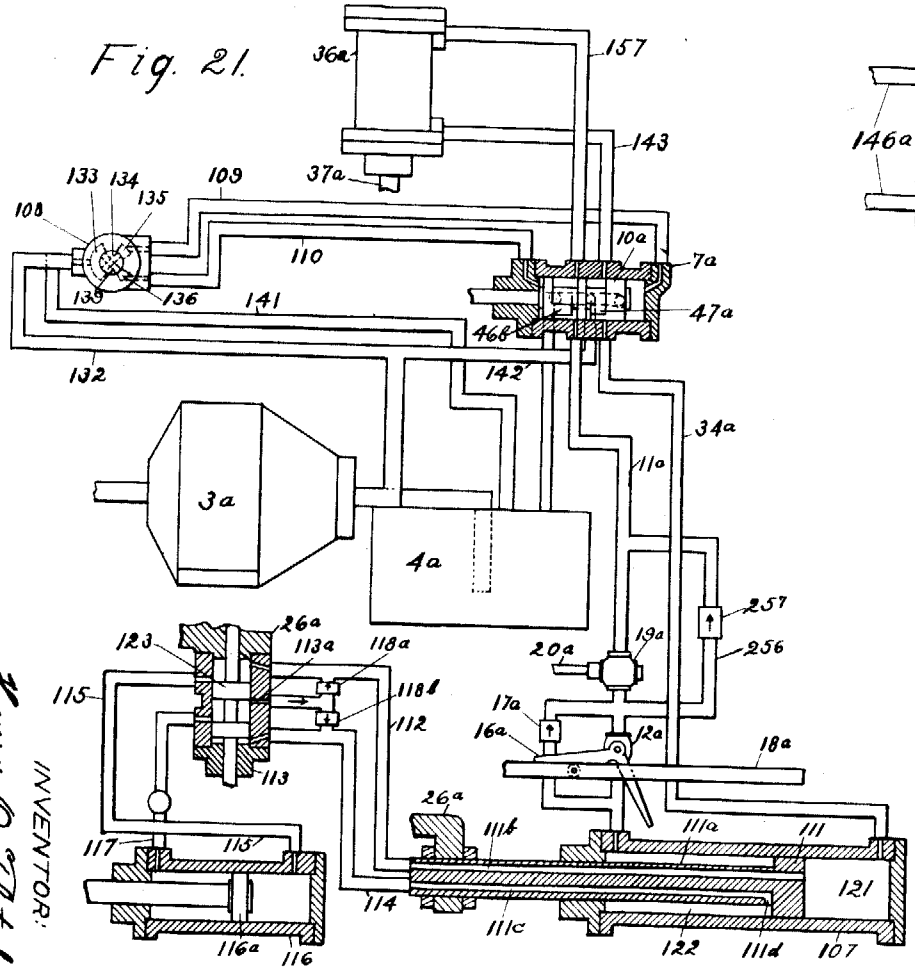

Fig. 21 is a diagram of the hydraulic connections used for operating the motors.

Figure 22:
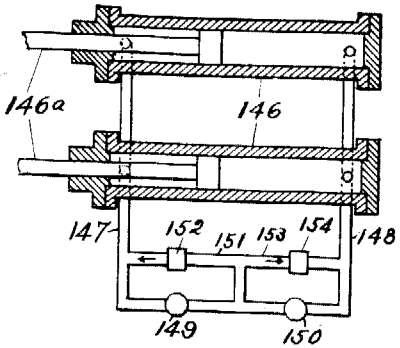

Fig. 22 is a diagram of the piping system to control the movements of the work holder.

Fig. 23 is a plan view of the auxiliary reversing valve.

Fig. 24 is a sectional elevation of the same.

Figure 25:
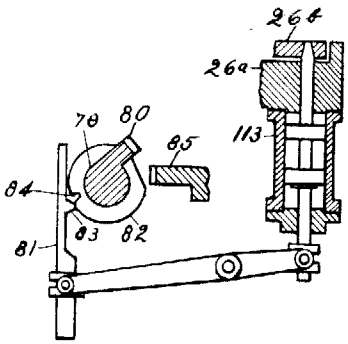

Fig. 25 is a side elevation of another locking device together with the device for engaging the turret indexing motor.

Fig. 26 is a plan view of the load and fire device for operating the main reversing valve.

Fig. 27 is a modification of the piping system shown in Fig. 4.

Fig. 28 represents a piping system auxiliary to that shown in Fig. 27.

Fig. 29 is a plan view of the reversing valve shown in Fig. 28.

Figures 30, 31, 32, 33, 34, 35, 36, 37, 38:
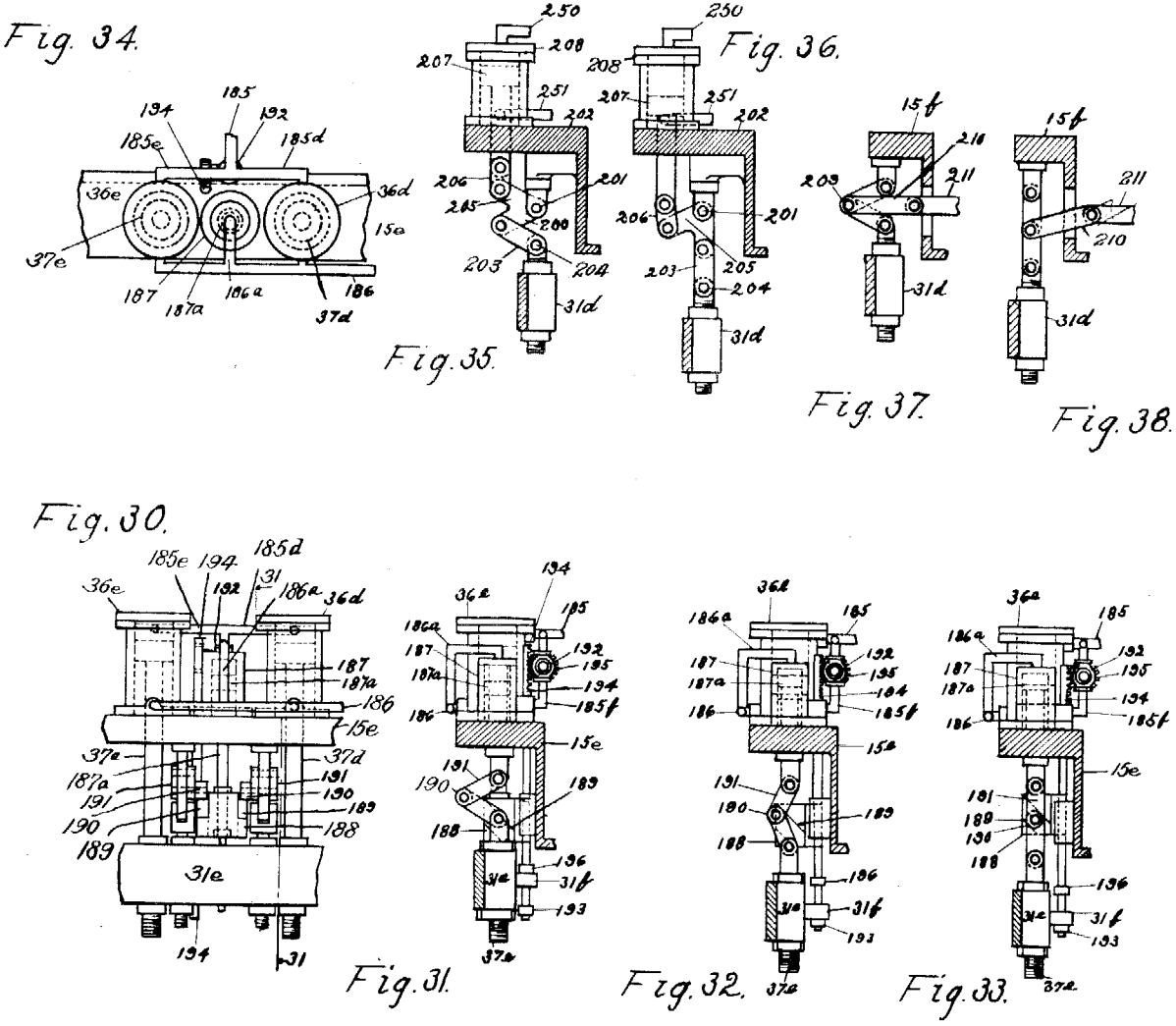

Fig. 30 is a front elevation showing a method of operating the toggle for holding the cutter with rigidity during its operation on the work.

Fig. 31 is a side sectional view taken on line 31—31 of Fig. 30.

Figs. 32 and 33 are views similar to Fig. 31 showing the parts in various position of operation.

Fig. 34 is a plan view of Fig. 30.

Figs. 35 and 36 are side views showing another method of operating the toggle.

Figs. 37 and 38 are side views showing still another method of operating the toggle.

Figs. 39 to 42 are plan views of a modified mechanism for operating the main valve showing the parts in various positions of operation.

Figure 43:
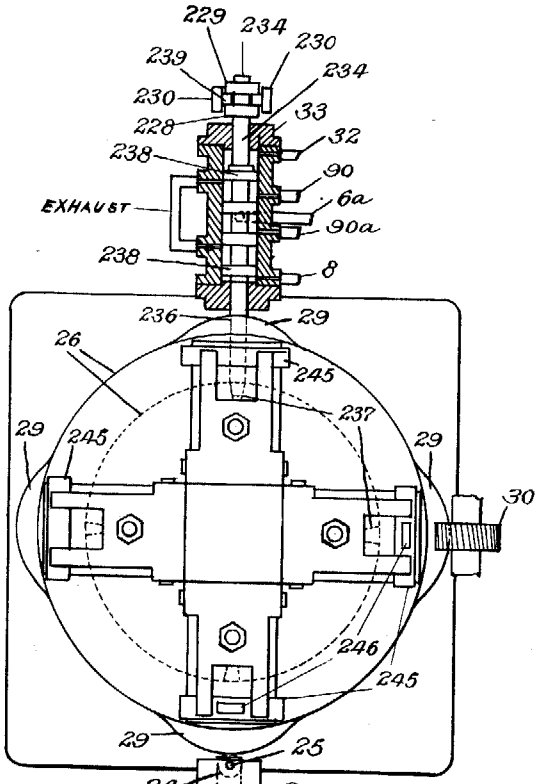

Fig. 43 is a plan view of the work holder showing the method of clamping the work in position and also the manner of locking the work holder during the operation by the cutter.

Figure 44:
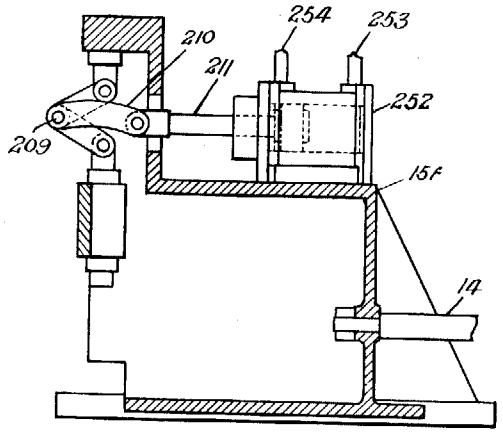
Figure 45:
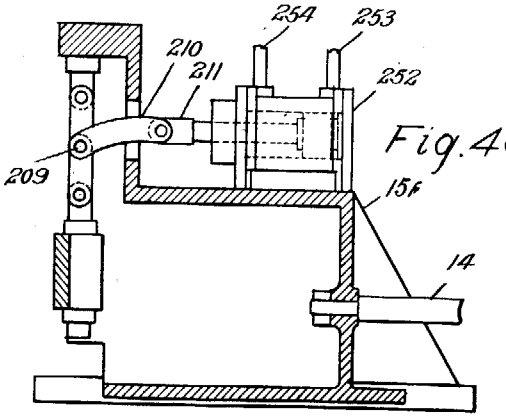

Figs. 44 and 45 are side views showing the manner of operating the toggles illustrated in Figs. 37 and 38.

Figure 1:
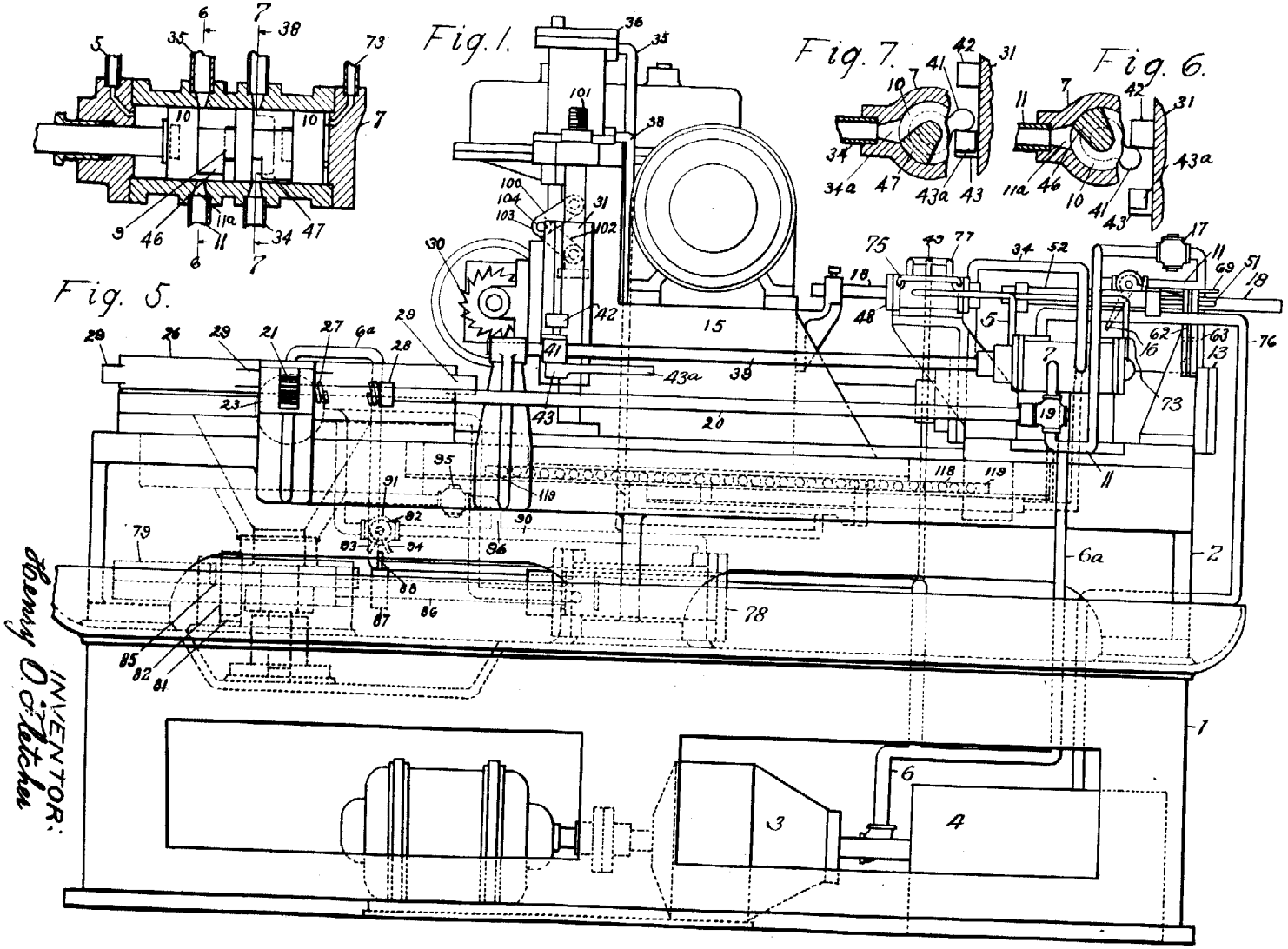
Fig. 1 is a side elevation of one embodiment of the invention.

Referring to Figs. 1 to 3 the base 1 supports table 2, upon which most of the mechanism is mounted, and the pump 3, mounted within base 1 supplies fluid under pressure from tank 4 through pipe lines to the various hydraulic motors.

The pipe 6 through various branches, supplies fluid under pressure to the various motors and the fluid is controlled by valves as will be hereafter explained.

The carriage 15 is reciprocated by hydraulic motor 13, being guided in ways formed in table 2, and bar 18 is adjustably fastened to carriage 15, as shown. The cutter carrying slide 31, slidably mounted on carriage 15, is raised and lowered by hydraulic motor 36 rigidly mounted on carriage 15. Cutter 30 is adjustably mounted on slide 31.

Fluid is supplied to main valve 7 through pipe 6a and port 9 (see Figs. 4 and 5). When plunger 10 is in its right hand position, and segment 46 formed on plunger 10 is in the position shown in Fig. 6, fluid flows through pipe 11 and valve 12, to the right hand end of cylinder 13 to advance piston 14 and carriage 15. The valve 12, two arm lever 16, check valve 17 and slide bar 18 serve to control the movements of carriage 15, but constitute no part of the present invention.

The turret 26 rotates in a bearing rigidly mounted on table 2 in the usual manner, and is rotated by means of the action of piston rod 86 of hydraulic motor 78 which will hereinafter be explained.

The valve 19, interposed in pipe 11, is automatically opened and closed by rod 20. Pinion 21, fast on rod 20, meshes with rack 22, which slides in bearing 23. Roll 24 is pivoted at 25 in rack 22, and is held against turret 26 by means of torsional spring 27 fastened at one end to collar 28, fast on rod 20, and at the other end to bearing 23. The cams 29, project from the periphery of turret 26, to operate rack 22, and rod 20 for opening and closing valve 19.

When turret 26 starts to rotate cam 29 recedes from roll 24, and spring 27 rotates rod 20 to close valve 19, and as turret 26 is completing its rotation another cam 29 operates rack 22, pinion 21 and rod 20 to open valve 19. Thus it will be seen that no fluid can flow to cylinder 13 to advance carriage 15 until turret 26 has completed its rotation.

The pipe 256, containing check valve 257, by-passes valve 19 to allow free flow of the exhaust from the right hand end of cylinder 13 in the direction of the arrow to the exhaust pipe 76 through the valve 7 when valve 19 is closed.

This precludes any trouble that may be caused by the advance of carriage 15, and cutter 30, before the completion of the rotation of turret 26. This by-pass is shown in Fig. 4, but is omitted from Figs. 1, 2 and 3 in order to avoid confusion in the drawings.

Cutter 30 is driven by an electric motor, mounted on carriage 15, through gearing, not shown, as it forms no part of my invention.

The slide 31 carrying cutter 30 is slidably mounted on the carriage 15 for raising the cutter to clear the work and lowering it to operative position.

Pipe 32 leads from pipe 11 to locking motor 33 to lock turret 26 firmly in position during the operation of the cutter upon the work.

Pipe 34 leads from valve 7, as shown, to the left hand end of cylinder 13 to propel piston 14 and carriage 15 to the right.

Pipe 8 leads from pipe 34 to locking motor 33, as shown to unlock turret 26 which will hereafter be explained.

Pipe 35 leads from valve 7, at port 35a, to the upper end of cylinder 36 to propel piston 37 and slide 31 downward; and pipe 38 leads from valve 7, at port 38a, to the lower end of cylinder 36 to raise slide 31 and cutter 30.

Telescoping connections are interposed in pipes 35 and 38 as shown to allow movement of carriage 15 and keep the pressure intact, but form no part of my invention.

The plunger rod 39, integral with plunger 10, extends through bearing 40; and the arm 41, fast on rod 39, extends into the path of blocks 42 and 43, adjustably clamped to slide 31 by means of T slot 44. When slide 31 raises, the extended arm 43a, of block 43, engages arm 41 turning rod 39 anti-clockwise as viewed in Fig. 7. When slide 31 lowers, block 42 engages arm 41 to turn rod 39 clockwise as shown in Fig. 6.

It will be seen by the foregoing, that the blocks, or dogs, 42 and 43 rotate plunger 10 in valve cylinder 7. The segment 46 is formed integral with piston 10 and normally covers the port opening 11a, leading to pipe 11, so that no fluid will flow through pipe 11 until dog 42 has engaged arm 41 to rotate segment 46 into the position shown in Fig. 6, uncovering port 11a. Thus it will be seen that carriage 15 will not advance until slide 31 has lowered. In the same manner segment 47 formed on plunger 10 will cover port 34a, after plunger 10 is propelled to the left, (see Fig. 4) until dog 43 has rotated plunger 10 to the position shown in Fig. 7, thus preventing the return of carriage 15 previous to the raising of slide 31 and cutter 30.

The pipe 49 connects supply pipe 6 with the auxiliary valve 48 to supply pressure fluid to valve 48 (see Figs. 4 and 17).

The piston 50 oscillates in valve 48, and is integral with rod 51 which extends through cylinder, or tube, 52 and bearing 53. The collar 61 is securely fastened to rod 51, and is normally held in alignment with the inwardly projecting ledge 54, formed in tube 52. The washers 57 and 58 are loosely mounted on rod 51, and are held against ledge 54 by means of springs 55 and 56, respectively, which are held under compression by collars 59 and 60, respectively fast in the tube 52. The latch 62 is pivotally mounted at 63 in bearing 53, and is normally held in latched engagement with groove 64 or groove 65 formed in rod 51 by a spring 400. The collar 72 is adjustably mounted on tube 52, and has the projecting arm 72a which extends into the path of dogs 66 and 67 adjustably mounted on slide bar 18 which partakes of the reciprocating movement of carriage 15. The collar 68 is also adjustably mounted on tube 52 and carries the extending finger 69 which slides in a guide formed in the top of bearing 53.

The cam surfaces 70 and 71 are formed on the side of finger 69 and are adapted to engage latch 62 to force it out of engagement with groove 64.

When dog 67, by reason of the movement of carriage 15 and bar 18, engages arm 72a of collar 72, to force tube 52 to the right, collar 60 compresses spring 56, as collar 61 prevents movement of washer 58 and the rod 51 being held from movement by the engagement of latch 62 with groove 64. This compression takes place until cam 71 disengages latch 62 from groove 64, when spring 56 forces rod 51 and piston 50 to the right, reversing valve 48. When dog 66 engages collar 72, to force tube 52 to the left, spring 55 is compressed, the latch 62 holding rod 51 from movement by reason of engagement with groove 65, until disengaged by cam 70, when piston 50 is forced to the left by the action of spring 55.

It will be seen that the above described device constitutes a load and fire mechanism to quickly operate valve 48.

This load and fire mechanism could be applied to valve 7 and rod 39, but as the weight of the parts is such as to cause considerable inertia, a very powerful spring would be necessary.

The pipe 75 connecting the chamber at either end of valve 48 serves to allow any air, or other fluid to pass freely from one chamber to the other to prevent any compression in either chamber during the action of piston 50.

Exhaust passes from valve 7 to tank 4 through pipe 76, and exhaust from valve 48 through pipe 77.

When piston 50 is in the position shown in Fig. 17 fluid flows in at port 49a and out through pipe 73 to the right hand end of valve 7 to force plunger 10 to the left thus raising slide 31 which movement uncovers the port to pipe 34 to return carriage 15, and fluid also flows through pipe 8 to operate locking motor 33 to unlock turret 26. When piston 50 is in its right hand position fluid flows through pipe 5 to the left hand end of valve 7 to force plunger 10 to its right hand position uncovering the port to pipe 35 supplying fluid to the upper end of cylinder 36 to lower piston 37 and slide 31, which lowering movement uncovers the port to pipe 11 to advance carriage 15 and through pipe 32 to lock turret 26.

As has been explained fluid pressure flows to locking motor 33 through pipe 8 to force piston 238 outward and withdraw bolt 236 out of recess 237 formed in turret 26 to allow free movement of turret 26, and fluid pressure flows through pipe 32 to motor 33 to force bolt 236 into recess 237 thus locking turret 26 firmly in position during the cutting operation.

After bolt 236 has been removed from recess 237, piston 238 continues its movement to connect supply pipe 6a with pipe 90 for supplying fluid to right hand end of motor 78 to index turret 26. See Figs. 4 and 43.

As bolt 236 is forced into recess 237 pipe 6a is connected to pipe 90a for supplying fluid to the left hand end of motor 78 to return rack 79 to initial position.

Rack 81 is reciprocated by connecting rod 233, pivotally connected at one end to rack 81, and at the other end to the lower end of lever 230, fulcrumed at 231 in bracket 232. The upper end of lever 230 is engaged by piston rod 234, formed integral with piston 238 of locking motor 33. Collar 228, fast on rod 234, engages pins 239, fast in lever 230, to rock lever 230 clockwise as rod 234 moves to the right, (see Fig. 3) and collar 229, fast on rod 234 engages pins 239 to rock lever 230 anticlockwise as rod 234 moved to the left.

It will be seen that, as piston 238 reciprocates, lever 230 will reciprocate rack 81, which rotates segment 82 by the engagement of tooth 83 with space 84 formed in segment 82. See Figs. 12 and 13.

Segment 82 encircles the circular part of rack 79, a portion being cut away so that the end surfaces of segments 82 engage either side of the extended part of rack 79 on which the teeth 80 are cut.

The rack 79 is slidingly fitted to segment 82, and both are mounted in bearings in a manner to allow rotation with each other, but to prevent segment 82 from partaking of the reciprocating movement of rack 79. The extended portion of rack 79, on which teeth 80 are formed, is so located that the teeth 80 terminate at their lower end on a line radial with the center of the circular portion of rack 79, the teeth 80 being at right angle to that line, so that, as rack 79 rotates, teeth 80 will mesh with gear 85, fast on the stem of turret 26, without interference. Also the stroke of piston 86 is limited at each end so that the teeth 80, of rack 79, are in exact alignment with the corresponding spaces of gear 85. This insures the desired movement of turret 26.

The rack 81, which operates segment 82 to rotate rack 79 has but a single tooth 83 of coarse pitch which meshes with the space 84, formed in segment 82, to rotate segment 82 and rack 81 in either direction. After rack 79 has been rotated anti-clockwise, as in Fig. 12, rack 81 continues its movement to the position shown, with the top of tooth 83 in engagement with surface 82a, of segment 82, thus forming a secure lock to hold the teeth 80 in perfect mesh with gear 85 fast on turret 26. When rack 79 has been rotated to disengage teeth 80 from gear 85, tooth 83 is positioned under surface 82b of segment 82 to lock rack 79 out of engagement during its return movement, as shown in Fig. 13. Also the above described device provides a movement of locking motor which prevents the flow of fluid to motor 78, for indexing turret 26, previous to the perfect meshing of rack 79 with gear 85; and also prevents any return movement of rack 79 until it has been completely disengaged.

Referring to Figs. 4 and 8 to 11 inclusive, the piston rod 86, of indexing motor 78, is rigidly connected to indexing rack 79, and adjustably mounted thereon is collar 87 carrying the two projecting arms 88 and 89. The supply pipe 90 extending from locking motor 33, to supply fluid to motor 78 for indexing turret 26 has interposed valve 91, on the stem of which is adjustably fastened collar 92 carrying arms 93 and 94.

When rack 79 has been rotated into meshing position with gear 85 collar 87 is in the position shown in Fig. 9, with arm 88 in alignment with arm 93, so that as piston 86 advances near the end of its stroke to index turret 26, arm 88 engages arm 93 turning collar 92 to almost, but not quite, close valve 91 gradually reducing the flow of fluid to motor 78 thus decelerating the rotation of turret 26 to effect a gradual stop. When rack 79 has been rotated out of mesh with gear 85 fluid enters the left hand end of motor 78 through pipe 90a to return piston 86, and collar 87 is in the position shown in Fig. 11 with arm 89 in alignment with arm 94, and engages arm 94 on the return movement of piston 86 to open valve 91. The check valve 95 and pipe 96 are interposed to allow free flow of exhaust fluid previous to the opening of valve 91.

Referring to Figs. 4, 14, 15 and 16, the piston 37 of motor 36 is connected with, and operates, slide 31 by means of piston rod 37a, and the block 97 is rigidly mounted on rod 37a.

A small space intervenes between block 97 and slide 31 to allow a slight lost motion between these parts, piston rod 37a being slidably mounted in slide 31. The check nuts 98 limit the upward movement of piston rod 37a relative to slide 31, and springs 99 tend to hold slide 31 firmly against check nuts 98. The pins 120 are fast in slide 31 and serve to prevent any turning movement of block 97.

Links 100 are pivotally connected at their upper ends with studs 101, which are adjustably mounted in carriage 15, and at the opposite ends with link 102, which are in turn, pivotally mounted on slide 31, forming toggle joints between carriage 15 and slide 31. These toggle joints are partly closed as slide 31 raises and opened as slide 31 lowers. When slide 31 has lowered to the position shown in Fig. 15 the rolls 103, loosely mounted on the middle studs 104 of the toggles, come into engagement with the lower surfaces of the angular slots 105, formed in the sides of block 97 as shown, so that the toggle cannot straighten further until block 97 travels downward with relation to slide 31. The completion of the toggle movement takes place during the lost motion movement described above, and as block 97 moves downward the upper surfaces of slots 105 engage rolls 103 to complete, and lock, the toggle movement, thus rigidly holding slide 31 in position as shown in Fig. 16, to prevent any chatter or vibration of slide 31 and cutter 30.

As piston 37 and block 97, move upward, the lower surfaces of slots 105 engage rolls 103, to break the toggles, and thereafter the nuts 98 engage slide 31 to raise it, thus clearing the cutter from the work.

The carriage 15 rides on rolls 118 which are supported by table 2, and the cage, or guide 119, forms a framework to hold rolls 118 in proper alignment.

It will be seen that cage 119 and rolls 118 travel with carriage 15, but only half the distance of the carriage. This arrangement reduces friction to a minimum.

Referring to Figs. 18 to 26 the assembly is similar in many respects to that described above, the principal difference being that I reciprocate the work support 26a, and mount the cutter support 106 rigidly on the supporting table 2a.

The cutter carrying slide 31a is slidably mounted on support 106 in the same manner as slide 31 is mounted on carriage 15, and slide 31a is raised and lowered by motor 36a mounted on support 106.

The hydraulic motor 107 is rigidly mounted on table 2a, and the reciprocating piston 111 is connected with work support 26a. The valve 7a is operated by reversing valve 108 by means of fluid passing through pipe 109 and 110 and valve 108 is operated by a load and fire mechanism which will hereinafter be described.

Two passages 111b, and 111c, are drilled in piston rod 111a, passage 111b passing through its entire length of rod 111a and piston 111, connecting the rear chamber 121 with pipe 112, which in turn, is connected with the upper end of locking motor 113, for unlocking turret 26b. Passage 111c passes through the entire length of rod 111a, but not through piston 111, being connected with chamber 122 by short passage 111d. Pipe 114 connects passage 111c with the lower end of locking motor 113 for locking turret 26b. Pipe 115 connects the upper chamber of motor 113 with the right hand end of indexing motor 116 for indexing turret 26b, so that said pressure fluid flowing into the right hand end of motor 107 will unlock turret 26b and then operate motor 116 to index turret 26b.

The pipe 117 connects the lower part of motor 113 with the left hand end of motor 116, so that fluid entering the left hand end of motor 107 will flow to the lower end of motor 113 to first lock turret 26b, and then to return the piston 116a of motor 116 to original position. The check valves 118b and 118a will allow the exhaust to flow from port 113a to pipe 112, or pipe 114, but prevents the flow of pressure fluid to port 113a.

By the foregoing it will be seen that when fluid under pressure is delivered to chamber 121, of motor 107 that it will exert a force on piston 111 to urge work support 26a, to which piston rod 111a is connected, to the left, and also will force piston 123 in locking motor 113 downward unlocking turret 26b, after which the port leading to pipe 115 will be uncovered delivering fluid to the right hand end of motor 116 to index turret 26b.

When fluid is delivered to the left hand end of motor 107 pressure is exerted on piston 111 to urge work support 26a to the right, and also to lock turret, 26b, after which the port leading to pipe 117 is opened for delivering fluid to the left hand end of motor 116 to return piston 116a to its original position.

Piston 116a is connected to circular rack 79 in the same manner as piston rod 86, and segment 82 and rack 81 are operated by locking motor 113 in substantially the same manner as by locking motor 33. The circular rack 79 engages gear 85 fast on the shaft of turret 26b in the manner before illustrated to index turret 26b. Motors 113 and 116 are mounted on and move with work holder 26a.

The load and fire device, for operating reversing valve 108, consists of two rods 51a and 51b.

Rod 51a carries cylinder 52a in which is contained springs 55a and 56a. These springs, as will be seen, perform similar functions, respectively as springs 55 and 56 of the previous described load and fire mechanism. The rods are firmly fastened together by yoke 124, and are adapted to slide in bearings 53a and 53b. The yoke 124 has a projecting lug 124a which extends into the path of dogs 66a and 67a carried by sliding bar 18a which, in turn, is adjustably connected to work support 26a by bracket 125. The block 126 is clamped to cylinder 52a and slot 126a, in block 126, receives roll 127, carried by arm 128 fast on the stem of reversing valve 108; and sector 129, also fast on the stem of valve 108, contains recesses 129a and 129b into which latch 130 is forced by spring 156. When work support 26a travels to the left dog 66a engages lug 124a to slide rods 51a and 51b to the left tending to turn the stem of reversing valve 108 clockwise, but is prevented by the engagement of latch 130 with recess 129b, thus compressing spring 56a. When rod 51b has traveled sufficiently the beveled collar 131, adjustably mounted on rod 51b, engages latch 130 releasing it from recess 129b and allowing the pressure of spring 56a to turn valve 108 clockwise by the action of block 126 on roll 127 thus reversing the flow of fluid in pipes 109 and 110 and resetting valve 7a. When work support 26a travels to the right dog 67a engages lug 124a, compressing spring 55a until collar 131a engages latch 130, to release it from recess 129a, to allow the force of spring 55a to turn reversing valve 108 anti-clockwise, again reversing the flow of fluid in pipes 109 and 110, and resetting valve 7a.

The pressure supply pipe 132 supplies pressure to chamber 133, of valve 108, and this pressure fluid flows through passage 134, to chamber 135, or 136, according to the position of rotor 108a. In the position shown in Figs. 23 and 24 pressure fluid flows through passage 134 to chamber 135 and pipe 109 to the right hand end of valve 7a to force plunger 10a to the left, and when pressure fluid flows to chamber 136, and pipe 110 to the left hand end of valve 7a, plunger 10a is forced to the right.

When pressure fluid flows through pipe 109 to valve 7a the exhaust returns through pipe 110 to chamber 136, and through passage 139 to chamber 140, from which it is delivered to tank 4a through exhaust pipe 141. When fluid is delivered to valve 7a through pipe 110 the exhaust returns through pipe 109 to chamber 135 thence to tank 4a through pipe 141.

When fluid is delivered to valve 7a through pipe 142 and plunger 10a is in the position shown in Fig. 21, fluid flows through pipe 143 to the lower end of motor 36a to raise piston 37a and slide 31a; and, as slide 31a, raises dog 43b, adjustably clamped to slide 31a, engages block 144, mounted on rack 145, to force rack 145 upward turning pinion 346 and segments 47a, formed on plunger 10a clockwise, to open the port to pipe 34a supplying fluid to the right hand end of motor 107 to retract work support 26a. When plunger 10a is moved to its right hand position fluid flows through pipe 157 to the upper end of motor 36a to lower slide 31a. As slide 31a lowers dog 42a engages block 144 to lower rack 145 and turn piston 10a to move segment 46b from the port leading to pipe 11a to supply fluid to motor 107 to advance work holder 26a.

When fluid pressure is applied to motor 107 through pipe 34a to return work holder 26a pressure is also applied to motor 116 for rotating, or indexing, turret 26b as has been described, and there is no way to regulate the speed of the return movement of work holder 26a independent of the rotary movement of turret 26b. The device illustrated in Fig. 22 accomplishes this regulation. Cylinders 146 are mounted fast on table 2a and their piston rods 146a are fastened at their outer ends to work holders 26a. Pipe 147 is connected to the left hand end, and pipe 148 is connected to the right hand end of cylinders 146. These two pipes are connected together, as shown, with valves 149 and 150 intervening. The pipe 151, containing check valve 152, by-passes valve 149 so that fluid may freely flow in the direction of the arrow but flow in the opposite direction is prevented. Pipe 153 by-passes valve 150, and check valve 154 permits the flow of fluid in the direction of the arrow only.

Cylinders 146 and the connecting piping system are filled with liquid under atmospheric pressure, so that pistons 146a are restricted in their movement by valves 149 and 150, the contained liquid being practically non-compressible.

When pistons 146a are urged to the right there will be a pressure set up in pipe 148 and the flow of fluid is regulated by valve 150, and when pistons 146a are urged to the left pressure is set up in pipe 147, and the flow is regulated by valve 149. Thus the movements of work holder 26a are governed in either direction independent of the rotary movement of turret 26b.

Referring to Figs. 27 to 29, the operation of auxiliary valve 48c and main valve 7c is identical to that of valves 48 and 7, respectively, as illustrated in Fig. 4, except that the longitudinal movement of plunger 10c to the right delivers fluid to the right hand end of cylinder 13c through pipe 11c for advancing carriage 15c the fluid pressure being transmitted through passage 14d, in piston 14c, and pipe 160 to the upper end of motor 36c to lower the slide 31; and and the segments 46c and 46d formed on plunger 10c serve to open ports to pipes 161 and 162, respectively, to operate locking motor 33c for locking and unlocking the turret. When plunger 10c moves to the left fluid is delivered through pipe 34c to the left hand end of cylinder 13c for returning carriage 15c, and also the fluid pressure is transmitted through passage 14e pipe 163 to the lower end of motor 36c to raise slide 31.

Carriage 15c and cutter carrying slide 31 are mounted in the same manner and perform the same functions as carriage 15 and slide 31 shown in Figs. 1 and 2.

The valve 19a is opened and closed by rod 20a which is operated by cams 29, fast on turret 26b, in a similar manner as that of valve 19. See Figs. 1 and 2. In Figs. 18 and 19 gear 20b is slidably keyed to shaft 20a, and meshes with gear 20c, fast on the stem of valve 19a. As valve 19a is not not in position to line with shaft 20a gears 20b and 20c are interposed to connect these parts for operation.

The by-pass pipe 241, containing check valve 242, bypasses valve 19a for the purpose of allowing the exhaust fluid to flow from the left hand end of cylinder 107 when valve 19a is closed, as indicated by the arrow.

As this arrangement provides no way to control the movement of carriage 15c independently of the movement of the cutter carrying slide 31a, the controlling system shown in Figs. 28 and 29 is interposed.

Cylinder 164 is securely fastened to table 2 and piston 165 is fastened to carriage 15c by means of lug 166. Pipe 167 leads from the left hand end of cylinder 164 to chamber 168 in reversing valve 169, and pipe 170 leads from the right hand end of cylinder 164 to chamber 171 in valve 169. The passage 172 in the rotor of valve 169 connects chamber 171 with chamber 173 when in the position shown, and connects chambers 168 and 174 when the rotor is tuned to its reversed position. The cylinder 164 and connecting pipes are filled with a liquid at atmospheric pressure.

When pressure is applied to the left hand end of cylinder 13c fluid will flow through passage 14e and pipe 163 to the lower end of motor 36c to raise slide 31, and as fluid cannot flow from chamber 168 to chamber 174 there will be no movement of carriage 15c until slide 31 raises sufficiently to turn plunger and plunger rod 10c when the gear 176, fast on said plunger rod, turns gear 179 fast on the stem of valve 169, reversing valve 169, and allowing fluid to flow through pipe 181 to tank 178.

When pressure is applied to the right hand end of cylinder 13c, fluid will flow through pipe 160 to lower slide 31, but piston 14c will not retract carriage 15c until valve 169 is again reversed by the lowering of slide 31 to allow fluid to flow from chamber 171 to chamber 173 and to tank 178 through pipe 177. The valve 180 regulates the return movement of carriage 15c.

Having reference to Figs. 30 to 34 inclusively, the cutter slide 31e is raised and lowered by the hydraulic motors 36d and 36e by means of pistons 37e and 37d. Supply pipe 185 supplies fluid under pressure, through its branches 185d and 185e to the upper ends of motors 36d and 36e, respectively, for lowering slide 31e. The supply pipe 186 supplies fluid under pressure to the lower end of motors 36d and 36e to raise pistons 37d and 37e, respectively, thus raising slide 31e.

The small hydraulic motor 187 contains piston 187a which is adjustably connected with block 188 containing the angular cam slots 189 into the upper ends of which rolls 190, mounted on the middle joints of toggles 191 enter as slide 31e lowers to the position shown in Fig. 32.

The pipe 185f leads from pipe 185 to supply fluid to the lower end of motor 187 to raise piston 187a. The valve 192 interposed in pipe 185f remains closed during the downward movement of slide 31e, until it reaches the position shown in Fig. 32, when valve 192 is opened by the engagement of lug 31f, extending from slide 31e, with collar 193 mounted on rack 194, slidable in lug 31f, lowering rack 194 and rotating pinion 195 mounted on the stem of valve 192, thereby opening said valve 192 to supply fluid for raising piston 187a. This upward movement of piston 187a and block 188 straightens toggle 191 by the action of cam slots 189 on rolls 190, as shown in Figure 33, thus holding slide 31e and the cutters mounted thereon rigidly in operating position.

The pipe 186a leads from pipe 186 to the upper end of motor 187 for lowering piston 187a. Thus it will be seen that when fluid is supplied to motors 36d and 36e through pipe 185 slide 31e will lower until lug 31f engages collar 193, opening valve 192 to raise piston 187a and block 188 for completing the toggle movement.

When fluid enters motors 36d and 36e through pipe 186 to raise slide 31e fluid also enters the upper end of motor 187 to lower piston 187a and block 188, and the upper surfaces of slots 189 engage rolls 190 to break the toggle into the position shown in Figure 32 thus releasing it to allow the completion of the upward movement of slide 31e.

As slide 31e nears the end of its upward movement lug 31f engages collar 196 to close valve 192.

The motor 187 may be made to lower block 188 to straighten toggle 191 by making slots 189 to the angle shown in Figs. 4 and 14 to 16, connecting pipe 185f to the top of motor 187 and pipe 186a to the bottom of motor 187, but I have used the arrangement shown in Figs. 30 to 34 in order that rolls 190 may more readily engage slots 189.

With reference to Figs. 35 and 36 the toggle link 200 is pivotally connected at 201 to the support 202 and link 203 is pivoted at 204 to slide 31d. The arm 205 is integral with the link 200 and is pivotally connected at its outer end with the lower end of link 206 which in turn is pivoted at its upper end to piston 207 reciprocated by motor 208 so that when piston 207 lowers the toggle will straighten, lowering slide 31d to the position shown in Fig. 36 thus holding the cutter carrying slide 31d rigidly in operating position. When piston 207 raises slide 31d is raised again into the position shown in Fig. 35 to clear the work by the cutter.

It is to be understood, although the cutter is not shown in Figs. 14 to 16, 30 to 38, 44 and 45, that it is mounted on the slides 31, 31e, 31d, 31f, and 31g, in the same manner as on slides 31, illustrated in Figs. 1, 2, 18 and 19, also that the slides 31d, 31e and 31g are mounted in the same manner and perform the same functions as slide 31 shown in Figs. 1 and 2, or in Figs. 18 and 19. Also that pipes 185, 186, 250 and 251 are connected with the valve distributing pressure supply fluid to their respective motors in a similar manner to that heretofore described.

In Figs. 37, 38, 44 and 45 the piston 211, or the other moving part is connected to the middle joint 209 of the toggle by means of link 210. When piston 211 moves to the left the toggle is broken and slide 31d is raised, and when piston 211 moves to the right, to the position shown in Figs. 38 and 45, the toggle is brought to straightened position and slide 31d is lowered to operating position.

The hydraulic cylinder 252 is mounted either on carriage 15f, or on a stationary framework of the machine, and reciprocates piston 211 by means of fluid flowing through pipes 253 and 254 which are connected with a main distributing valve similar to valve 7 shown in Figs. 1, 2 and 5.

With reference to Figs. 39 to 42, the valve 212 may be used instead of valve 7 and performs a similar function, and the load and fire mechanism connected therewith is similar to that shown in Fig. 17 except that ledge 54a is longer than ledge 54 to allow a limited movement of rod 51a independent of tube 52a which will be hereinafter explained.

The operation is by dogs 66 and 67 adjustably clamped to slide bar 18 which in turn is reciprocated by carriage 15 in the same manner as shown in Figs. 1 and 2. The piston 213 is operated by rod 51a in the same manner as rod 51 operates piston 50 of valve 48.

Figures 39, 40, 41, 42:
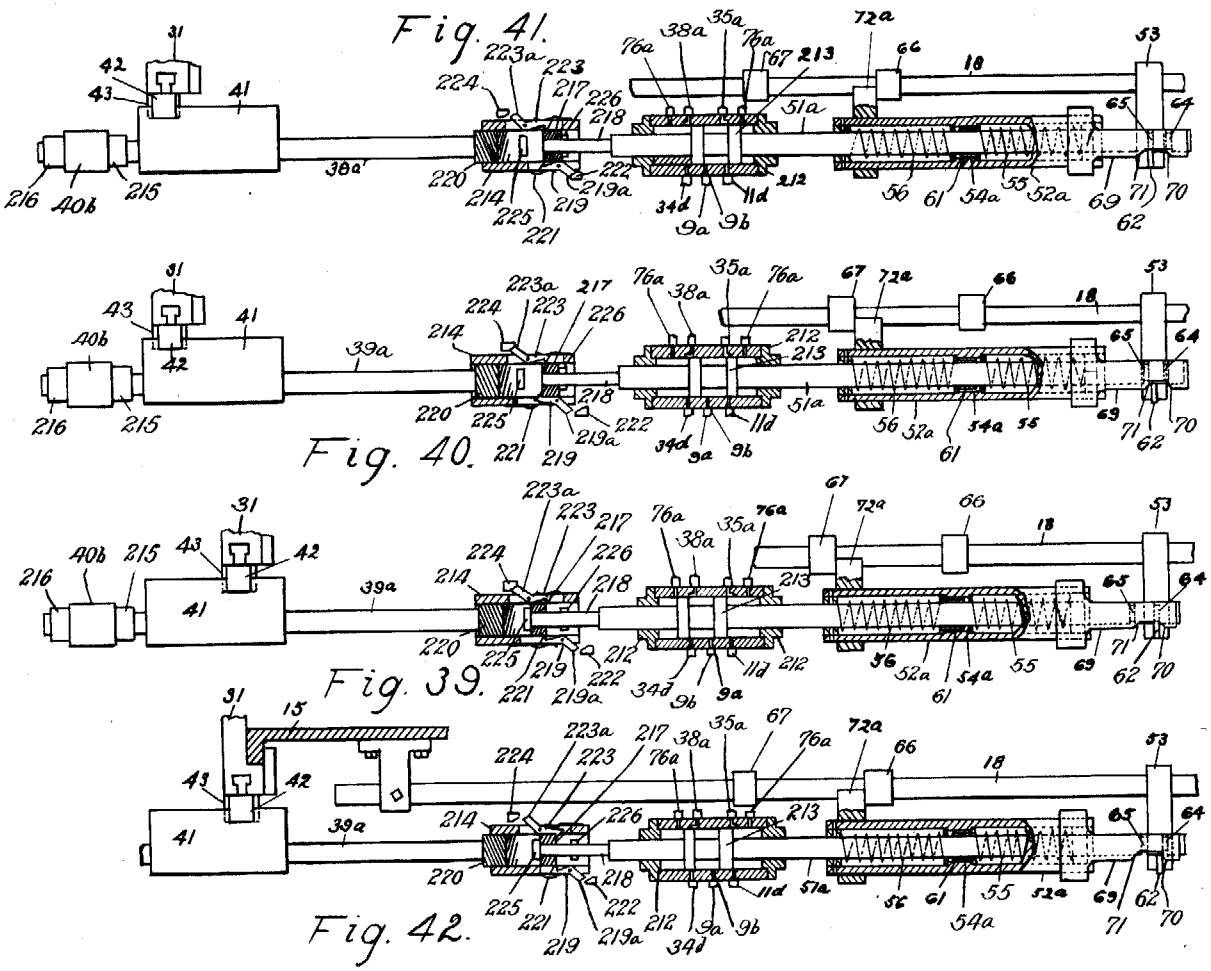

The cutter carrying slide 31 is mounted on carriage 15 as shown in Figs. 1, 2 and 42, and pipes 9a, 11d, 34d, 35a and 38a perform the same functions respectively, as pipes 9, 11, 34, 35 and 38 of Figs. 1, 2 and 4. Pipes 76a conduct the exhaust back to the supply tank.

When dog 67 engages lug 72a, spring 56 is compressed until cam 71 disengages latch 62 from groove 64, allowing spring 56 to slide rod 51a and piston 213 to the right into the position shown in Fig. 40, with collar 217, fast on piston rod 218, in position to be engaged by latch 219 which is pivotally mounted in slide 214 as shown. When piston 213 is in the position shown in Fig. 40 carriage 15 has completed its retractive movement and the port leading to pipe 35a is connected with supply port 9b thus supplying fluid to motor 36 for lowering slide 31. As slide 31 lowers dog 42 engages arm 41, turning rod 39a in the same manner as illustrated in Fig. 6. The enlarged end 220, of rod 39a, is threaded into the end of the cylindrical slide 214 by means of a right hand thread, and as rod 39a is held from lateral movement in either direction by collars 215 and 216, fast on rod 39a, and engaging either side of stationary bearing 40b, this turning movement propels slide 214, and piston 213 to the right into the position shown in Fig. 41, with the port leading to pipe 11d open to direct fluid to motor 13 for advancing carriage 15.

Slide 214 is held against rotary movement by a stationary guide not shown.

The last described movement of piston 213 is effected by means of latch 219, pivoted in slide 214, engaging collar 217 fast on rod 218, the engagement being effected by spring 221. As slide 214 moves to the right the projecting end 219a of latch 219 engages the stationary cam 222 to swing latch 219 out of engagement with collar 217 to allow a free return movement to the left of collar 217.

When carriage 15 has sufficiently advanced dog 66 engages lug 72*a*, compressing spring 55 until cam 70 releases latch 62 from groove 65, when the force of spring 55 propels rod 51*a* and piston 213 to the left into the position shown in Fig. 42 which uncovers the port leading to pipe 38*a* thus supplying fluid to the lower end of motor 36 for raising slide 31. In this position it will be seen that latch 223, pivoted in slide 214, is in engagement with collar 217 to draw it to the left.

As slide 31 raises dog 43 engages arm 41 to turn rod 39*a* into the position shown in Fig. 7, which propels slide 214 to the left opening the port leading to pipe 34*d* which supplies fluid to motor 13 to retract carriage 15 as shown in Fig. 39.

As slide 214 completes its movement to the left the projecting end 223*a* of latch 223 engages the stationary cam 224 releasing latch 223 to allow free movement of collar 217 to the right as shown.

Stop 225, attached to sleeve 214, is engaged by collar 217 at the end of its movement to the left, to prevent excess movement of piston 213 due to inertia, and stop 226 serves to limit the movement to the right in a similar manner.

The operation of the various embodiments will be apparent from the foregoing description. The work 245 is clamped on the work holder 26 by means of fixtures as shown in Fig. 43. The cutter, or work holder advances, as the case may be, until the cutter has completed its operation on the work, in the case shown to mill the flat indicated at 246. The cutter is raised to clear the work which movement initiates the relative retractive movement between the cutter and work holder, and also the unlocking of the work holder; the unlocking movement operates the indexing motor for indexing the work holder, and the first stage of the indexing movement closes the valve in the pipe supplying fluid for advancing the cutter. The retractive movement of the cutter initiates the lowering movement of the cutter; the latter part of the indexing movement opens the valve in the pipe for supplying fluid to advance the cutter; and the lowering movement of the cutter initiates the advance of the cutter.

The toggles illustrated may be operated by mechanical movements without the use of hydraulic motors. I have anticipated such changes, and I am aware that there are a variety of means for operating these toggles for rigidly holding the cutters in operating position that I have not shown. Those shown will suggest this fact.

I am aware also that the improved devices herein shown may undergo many changes in construction, and that the several devices may be combined in manners different than I have herein illustrated without departing from the spirit and scope of my invention.

Having described my invention what I claim as new is set forth in the following claims:

1. In a machine tool a work holder and a cutter, means to reciprocate one of said parts in a first path with relation to each other to effect a relative advance movement for the cutting operation and to return the reciprocating part, a cutter carrier adapted to raise the cutter in a second path for clearing the work and to lower it to operating position, means including a hydraulic motor for raising and lowering the cutter carrier, a toggle having one end secured to prevent movement with the carrier and the other end pivotally connected to the carrier, a roll mounted on the toggle at or near its central pivotal joint, a cam carried by the motor piston adapted to engage the roll during the latter part of the lowering movement of the carrier to force the toggle into straightened position and hold it in straightened position during the operation of the cutter on the work and to break and free the toggle during the beginning of the raising movement.

2. In a machine tool a work holder and a cutter, means to move one of said parts in a first path for performing an operation on the work by the cutter and return said part, a cutter carrier adapted to raise the cutter in a second path to clear the work, a reciprocating part for raising and lowering the cutter carrier having a slight lost motion movement with relation to the carrier during the latter part of its lowering movement, a toggle secured at one end in a manner to prevent movement with the carrier and pivotally connected at the other end to the carrier, a roll mounted on the toggle at or near its central pivotal joint, a cam carried by the reciprocating part adapted to engage the roll as the toggle approaches its straightened position to straighten the toggle during said lost motion movement and to hold the toggle in a straightened position during the operation of the cutter on the work, and to break the toggle during the lost motion portion of the raising movement.

3. In a machine tool a cutter and a work support, means to reciprocate one of said parts in a first path to effect an operation by the cutter upon the work, and to return said part; a cutter carrier adapted to raise the cutter in a second path to clear the work, and lower it to operating position; means, including a hydraulic motor, for raising and lowering the cutter carrier; a toggle secured at one end to prevent movement with the cutter carrier, and at the other end to the cutter carrier; a roll mounted on the toggle at, or near its central joint; a cam, adapted to engage said roll as the toggle approaches its straightened position, to assist in straightening the toggle, and to hold the toggle in straightened position during the operation of the cutter on the work, and to break the toggle after said operation to allow free upward movement of the carrier; and means to operate said cam.

4. In a machine tool a cutter and a work support, means to reciprocate one of said parts in a first path to effect an operation by the cutter upon the work, and to return said part; a cutter carrier adapted to raise the cutter in a second path to clear the work, and lower it to operating position; means for raising and lowering the cutter carrier; a toggle secured at one end to prevent movement with the cutter carrier, and pivoted at the other end to the cutter carrier; a roll mounted on the toggle at, or near its central joint; a cam, adapted to engage said roll as the toggle approaches its straightened position, to assist in straightening the toggle, and to hold the toggle in straightened position during the operation of the cutter on the work, and to break the toggle after said operation to allow free upward movement of the carrier; and means to operate said cam.

5. In a machine tool, a work holder and a cutter, means for reciprocating one of said parts relative to the other to perform a cutting operation upon the work and return said part to initial position, means including a hydraulic motor for rotating the work holder, a locking device for locking the work holder in position during the cutting operation and unlocking the work holder to allow free rotation thereof, a rack adapted to be reciprocated by said motor and also adapted to be engaged to and disengaged from a gear fixed to the work holder, means operative by the locking device for simultaneously unlocking the work holder and engaging the rack with the gear and thereafter locking the rack in engaged position and supplying fluid to the motor for rotating the work holder, means operative by the locking device for simultaneously disengaging the rack and locking the work holder and thereafter supplying fluid to the motor for returning the rack to initial position.

6. In a machine tool a cutter and a work holder; means to advance one of said parts to perform an operation on the work by the cutter, and return said part to initial position; means to rotate the work holder; a plurality of work station fixtures carried by the work holder; a plurality of cams carried by the work holder, one cam for each station; a hydraulic motor for advancing and returning said part; pipe lines for supplying fluid under pressure to said motor; a valve in the pipe line for operating the motor to advance said part; and gearing operated by said cams whereby the valve is closed at the beginning of said rotation to prevent the advance of said part, and opened as said rotation is being terminated.

7. In a machine tool, a cutter and a work holder; means to advance one of said parts relative to the other to effect a cutting operation on the work by the cutter, and return said part to initial position; means, including a hydraulic motor having a piston and piston rod, for rotating the work holder; a pipe line for supplying fluid under pressure to one end of the motor to operate the piston for rotating the work holder, and a second pipe line leading to the other end of the motor for returning the piston to initial position; a valve in the first mentioned pipe line; lever arms adapted to open and close the valve attached thereto; and means, operative by the movement of the piston, for engaging said arms, whereby said valve is gradually closed during the latter part of the piston's indexing stroke, and opened during its return stroke; and a pipe line bypassing said valve, containing a check valve for allowing free flow of exhaust fluid during the return stroke of the motor and checking flow of supply fluid to the motor.

8. In a machine tool, a work holder; a cutter carrying carriage adapted to be reciprocated with relation to the work holder to effect a cutting operation upon the work and return the carriage to initial position; a slide mounted on the carriage adapted to raise the cutter for clearing the work after the operation is completed and again lowering it to operative position; a first hydraulic motor mounted on the carriage for raising and lowering the slide; a second hydraulic motor, comprising a stationary cylinder, a piston and a piston rod adapted to reciprocate within the cylinder, the rod having connection to said carriage, and a passage through the piston and rod having pipe connection to the first motor whereby fluid pressure introduced into the stationary cylinder for advancing the carriage will also communicate with first motor to lower the slide; means to prevent the advance of the carriage previous to the lowering of the slide; and means, operative by the lowering movement of the slide for rendering inoperative said preventing means.

9. In a machine tool, a work holder; a reciprocating carriage adapted to be reciprocated with relation to the work holder; a cutter carrying slide mounted on the carriage for raising the cutter to clear the work after the operation upon the work is completed and again lowering the cutter to operative position; a first hydraulic motor, comprising a stationary cylinder, a piston and piston rod, the piston rod having connection with said carriage, for reciprocating the carriage; a second hydraulic motor mounted on the carriage for raising and lowering the slide; passages formed in the piston and rod of the first motor, having pipe connections with the second motor, whereby fluid pressure introduced into the first motor for advancing the carriage will also communicate with the second motor to lower the slide, and fluid pressure introduced into the first motor for retracting the carriage will also communicate with the second motor to raise the slide; means to prevent the advance of the carriage previous to the lowering of the slide and means to prevent the return of the carriage previous to the raising the slide.

10. In a machine tool, a work holder; a reciprocating carriage adapted to reciprocate with relation to the work holder; a cutter carrying slide mounted on the carriage for raising the cutter to clear the work after the operation upon the work is completed and again lowering the cutter to operative position; a first hydraulic motor, comprising a stationary cylinder, a piston and piston rod, the piston rod having connection with said carriage, for reciprocating the carriage; a second hydraulic motor mounted on the carriage for raising and lowering the slide; passages formed in the piston and rod of the first motor, having pipe connections with the second motor, whereby fluid pressure introduced into the first motor for advancing the carriage will also communicate with the second motor to lower the slide, and fluid pressure introduced into the first motor for retracting the carriage will also communicate with the second motor to raise the slide; means to prevent the advance of the carriage previous to the lowering of the slide and means to prevent the return of the carriage previous to the raising of the slide; means operative by the lowering movement of the slide, to free the carriage for advance movement, and means, operative by the raising movement of the slide to free the carriage allowing return movement thereof.

11. In a milling machine, a rotatable work holding turret, and a cutter; means to reciprocate one of said parts to provide an advance movement for performing a cutting operation on the work by the cutter and restore said part; a first hydraulic motor for reciprocating the reciprocating part; a cutter carrying slide adapted to move the cutter in a second path for retracting the cutter from the work after the operation is completed, and restoring the cutter to operating position; a toggle pivotally connected at one end to a frame work of the machine, and at the other end to the slide, so that the toggle will fold as the cutter retracts from the work and straighten as the cutter is restored to operating position; a second hydraulic motor for operating the slide and the toggle; means, including a third hydraulic motor, for rotating the turret; a locking device for locking the turret and holding it in locked position during the operation by the cutter, and unlocking it to allow rotation thereof; a fourth hydraulic motor for operating the locking device; a piping system to distribute fluid under pressure to the motors; a valve in the pipe line leading to the first motor for advancing the reciprocating part, adapted to be closed at the beginning of the turret rotation, and opened as the turret completes its rotation; means operative by the advance movement of the reciprocating part to operate the second motor for retracting the slide in the second path and folding the toggle; means operative by the retracting movement of the slide for operating the first motor for returning the reciprocating part, the fourth motor for unlocking the turret, and the third motor for rotating the turret; means operative by the rotary movement of the turret for operating the valve; means operative by the return movement of the reciprocating part for operating the second motor to restore the slide to operating position and straighten the toggle; and means operative by the restoring movement of the slide for operating the first motor to advance the reciprocating part and the fourth motor for locking the turret.

12. In a milling machine, a cutter and a work holder; means to reciprocate one of said parts in a first path to effect a cutting operation on the work and return the reciprocating part; means to retract the cutter in a second path to clear the work during the return movement of the reciprocating part and restore the cutter to the plane of operation; means to rotate the work holder; means for locking and unlocking the work holder; means operative by the second mentioned means during the retractive movement of the cutter for initiating a retractive movement of the first mentioned means to return the reciprocating part, and the fourth mentioned means to unlock the work holder; means operative by the fourth mentioned means for initiating the rotation of the work holder; means operative by the rotation of the work holder to control the first mentioned means to prevent the cutting operation taking place previous to the completion of the work holder rotation.

13. In a milling machine, a work holder and a cutter, means including a hydraulic motor for reciprocating one of said parts in a first path, to effect a relative advance movement between the cutter and work holder for performing a cutting operation by the cutter upon the work and returning the reciprocating part; a cutter carrier for retracting the cutter in a second path to clear the work during the return movement of the reciprocating part and restoring it to operative position; a hydraulic motor for operating the carrier; means to rotate the work holder, to present a new piece of work to the cutter, between cutting operations; a locking device for locking the work holder during cutting operations and unlocking it to allow rotation thereof; a pump and hydraulic piping system for supplying fluid under pressure to the motors; a valve in the pipe supplying fluid to the first mentioned motor for producing the relative advance movement; a rack and gear for opening and closing the valve; and cams carried by the work holder for actuating the rack and gear whereby the valve is maintained closed during the rotation of the work holder only.

14. In a milling machine a cutter and a work holder; means including a hydraulic motor for producing relative reciprocatory movement between said parts to perform a cutting operation on the work and restoring the parts to relative initial position; means to rotate the work holder between cutting operations; a pump and hydraulic piping system for supplying fluid under pressure to the motor; a valve in the pipe line supplying fluid to the motor for producing the relative advance cutting movement; and a rack and gear, operated by cams carried by the turret for closing, and maintaining the valve in closed position during the rotation of the work holder, one cam for closing the valve at the beginning of said rotation and another cam for opening the valve at the completion of said rotation.

15. In a machine tool a work holder and a cutter; means to reciprocate one of said parts relative to the other in a first path to perform a cutting operation on the work by the cutter and return the reciprocating part to initial position; a cutter carrier for retracting the cutter in a second path, to clear the work during the return movement of the reciprocating part, and restore it to the plane of operation; a toggle pivotally connected between the framework of the machine and the carrier; and mechanism including a hydraulic motor for operating the carrier, and supporting the toggle in straightened position during the cutting operation to maintain rigidity of cutting movement.

16. In a machine tool a cutter and a work holder; means to reciprocate one of said parts in a first path to perform a cutting operation on the work by the cutter and return the reciprocating part; a cutter carrier adapted to slide in guideways, formed in the frame-work of the machine, for retracting the cutter in a second path to clear the work during the return movement of the reciprocating part, and restore the cutter to the plane of cutting operation; a toggle pivotally connected between the frame-work of the machine and the carrier for operating the carrier; and a hydraulically operated reciprocating piston, pivotally connected with the toggle, adapted to operate the toggle into straightened position to restore the cutter to the plane of cutting operation, and maintain the toggle in straightened position during the cutting operation, and to partially fold the toggle thus retracting the cutter from the work after the cutting operation is completed.

17. In a machine tool a cutter and a work holder; means to reciprocate one of said parts with relation to the other in a first path, to perform a cutting operation on the work by the cutter, and return the reciprocating part; means to rotate the work holder to successively present new pieces of work for operation thereon by the cutter; means to lock the work holder in position during the cutting operation, and unlock it to allow rotation thereof; means including a cutter carrier and toggle for retracting the cutter in a second path to clear the work during the return movement of the reciprocating part and rotation of the work holder and return it to its operating position; means to operate the fourth mentioned means by the first mentioned means; means to operate the first and third mentioned means by the fourth mentioned means; and means to operate the second mentioned means by the third mentioned means.

18. In a machine tool a cutter and a work holder having a rotatable turret mounted thereon; means to reciprocate the work holder to effect a cutting operation on the work by the cutter and return the work holder to initial position; means to raise the cutter after the cutting operation is completed to clear the cutter from the work during the turret rotation; a locking device for locking the turret against rotation during the cutting operation; a first hydraulic motor comprising a stationary cylinder and movable piston for reciprocating the work holder; a second hydraulic motor for raising and lowering the cutter; a third hydraulic motor mounted on the work holder for rotating the turret; a combination hydraulic motor and valve for operating the locking device and supplying fluid under pressure to the third motor; a valve for supplying fluid under pressure to the first and second motors; means to operate the valve by the reciprocation of the work holder to supply fluid to the second motor to raise and lower the cutter; means to operate the valve by the raising and lowering movement of the cutter to supply fluid to the first motor to reciprocate the work holder; passages formed in the piston of the first motor having pipe connections with the motor valve for supplying fluid to lock the turret during the advance of the work holder and free the turret to allow rotation thereof during the return of the work holder; and means operative by the unlocking movement of the motor valve for supplying fluid to the third motor for rotating the turret.

19. In a milling machine, a rotatable work holder and a cutter; means to advance one of said parts in a first path to perform an operation on the work by the cutter, and return the advanced part; a cutter carrier adapted to slide in guideways formed in the framework of the machine for guiding the cutter in a second, retractive path away from the work to clear the cutter from the work during the rotation of the work holder, and back to operative position; a toggle pivoted at one end to the framework of the machine and pivoted at the other end to the carrier for retracting the cutter from the work as the toggle is folded and returning the cutter to operative position as the toggle is straightened; and means to fold and straighten the toggle.

20. In a machine tool a work support and a cutter; means, including a hydraulic motor, for advancing one of said parts, relative to the other, to perform a cutting operation on the work, and to return said part to initial position; means to rotate the work holder between cutting operations to present a new piece of work to be operated upon by the cutter; a piping system for distributing fluid under pressure to said motor; a pipe line for delivering fluid to said motor to effect said advance movement for the cutting operation; a control valve in said last mentioned pipe line; a by-pass pipe, having a check valve, for conducting exhaust fluid only past said control valve; and means, operative by the rotation of the work holder for closing said control valve at the beginning of said rotation to prevent the occurrence of said advance movement until the work holder has completed its rotary movement, and to open said valve at the end of said rotation.

HENRY O. FLETCHER.